Patented Dec. 12, 1922.

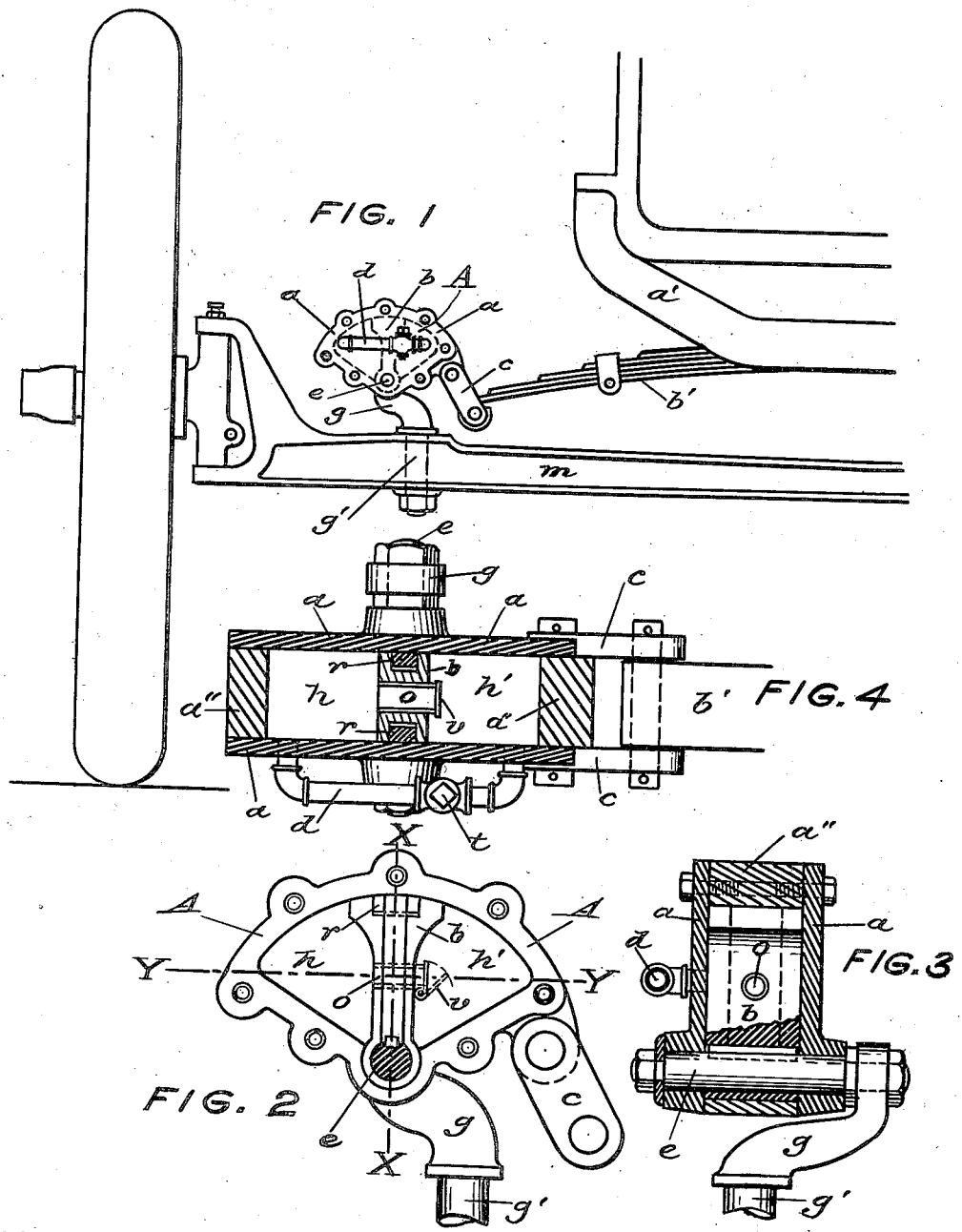

1,438,507

UNITED STATES PATENT OFFICE.

JAMES H. TAYLOR, OF PAWTUCKET, RHODE ISLAND.

SHOCK ABSORBER FOR MOTOR VEHICLES.

Application filed October 14, 1921. Serial No. 507,749.

*To all whom it may concern:*

Be it known that I, JAMES H. TAYLOR, a citizen of Great Britain, residing at 353 North Main Street, Pawtucket, in the county of Providence and State of Rhode Island, have invented certain new and useful Improvements in Shock Absorbers for Motor Vehicles, of which the following is a specification.

My invention relates to improvements in shock absorbers for motor vehicles. The purpose of my invention is to lessen shocks caused by irregularities in the road, also to lessen the intensity of the rebound of the vehicle body after depression of the springs by obstacles on the roadway, and the particular purpose and feature of my invention is to provide a hollow oscillating receptacle which may be either air filled or filled with a suitable liquid, said receptacle being provided with a partition or member within the same, fixed to some standing part of the automobile.

My invention is shown in detail in the accompanying drawings, in which—

Figure 1 represents a portion of the chassis and spring, axle, and wheel of the automobile.

Figure 2, an elevation of my invention showing the hollow receptacle with one wall thereof removed and the link connecting the same with the automobile spring.

Figure 3, a vertical section through the line X—X of Figure 2, and Figure 4 a horizontal section through the line Y—Y of Figure 2.

The same parts are referred to by the same letters throughout the various views.

In Figure 1, $a'$ represents a part of the supporting frame of an automobile, $b'$ being a portion of the spring. A is a front elevation of the hollow receptacle, substantially in the form of a quadrant and having one corner thereof connected to the end of the spring $b'$ by means of a link $c$ on each side. The hollow quadrantal receptacle A is pivoted upon the stud $e$ and this stud is itself fixed upon the bracket $g$ which is bolted to the axle $m$ of the automobile by means of the bolt $g'$. The quadrantal receptacle A is formed of the side walls $a$—$a$, seen best in Figure 4, and the intermediate members $a''$—$a''$, thus forming a hollow chamber so constructed as to hold without leakage any suitable liquid. As this receptacle is pivoted at $e$ it is evident that any vertical oscillation of the spring $b'$ will cause a like oscillation of the entire receptacle A upon the pivot $e$ by means of links $c$—$c$.

$b$, as shown in all the various figures, is a member fitted to the flat sides and the curved segment of the hollow receptacle A by suitable packing, $r$—$r$, so as to prevent the leakage of the enclosed liquid around the margin of the member $b$, said member $b$ thus operating by the oscillating of the receptacle A as a piston therein, and dividing the receptacle into two chambers $h$ and $h'$.

The member $b$ is keyed upon the stud $e$ so that its position remains constant with reference to the running gear of the machine, that is, it remains permanent and fixed with reference to the standing portion of the machine, the entire movement of the spring resulting in the oscillation of the receptacle A and not in any manner or degree affecting the member $b$.

In operation, the hollow chambers $h$ and $h'$, Figure 4, of the quadrant A are filled with a suitable liquid to a proper level to be determined by experiment, and as it is desired that there should be normally an approximate level in the two hollow chambers, $h$ and $h'$, I have provided a by-pass, $d$, with a suitable cock $t$ for regulating the quantity of flow through the same so that if by any mischance a greater volume of liquid should be upon one side of the fixed partition $b$ than on the other, it will very speedily rectify itself by means of the by-pass $d$.

I have also provided an opening, $o$, through the wall of the fixed partition $b$ from one chamber of the quadrant to the other, this opening having a valve $v$ upon the side nearest the link $c$. This valve is hinged at the lower edge thereof by a suitable spring hinge which keeps it normally closed but which yields readily to a pressure of liquid caused by a partial oscillation in an anti-clockwise direction of the quadrant A, as seen in Figure 1. As a result of this valve, it is obvious that the movement of the quadrantal receptacle A in a clockwise direction is slightly or not at all prevented by the compression of the spring $b'$, but the reverse movement in an anti-clockwise direction is very materially checked by the valve $v$, thus preventing the violent rebound of the vehicle when passing over an obstruction or a depression in the road.

I am aware that prior to my invention, shock absorbers of various forms have been devised embodying the use of liquids within a hollow chamber, but, so fas as I am aware, these devices have all employed a movable piston within such chamber and I know of no device which employs a fixed partition within a moveable receptacle.

The form of the device shown in my drawings is such as to admit of ready, easy, and cheap attachment to most of the automobiles in ordinary use. No external packing of any kind is required to keep my device tight, absolute tightness of the member $b$ in the receptacle A not being necessary, and all the important working parts are completely enclosed so that the same are not affected by dust or other exterior influences.

Having now described my invention, what I claim and desire to secure by Letters Patent is—

1. A shock absorber for motor vehicles comprising a bracket adapted to be attached to some standing part of the vehicle; a stud fixed upon said bracket; a member $b$ keyed to said stud and thus immovable with reference to the fixed parts of the vehicle; a hollow quadrantal receptacle oscillating upon the stud aforesaid and normally sub divided by said member $b$ into approximately equal chambers; and means for connecting said quadrantal receptacle to the vehicle spring, substantially as shown.

2. A shock absorber for motor vehicles comprising a bracket attachable to some standing part of the vehicle; a stud fixed upon said bracket; a member $b$ keyed to said stud; a hollow quadrantal receptacle oscillating on said stud and enclosing said member $b$ and normally divided thereby into two approximately equal chambers; and a link attached to the exterior of said hollow receptacle and connecting the same with the vehicle spring, substantially as described for the purpose specified.

3. A shock absorber for motor vehicles comprising a bracket attachable to some standing part of the vehicle; a stud fixed upon said bracket; a member $b$ keyed to said stud; a hollow quadrantal receptacle oscillating on said stud and enclosing said member $b$ and normally divided thereby into two approximately equal chambers; a pipe connecting said chambers and provided with a regulating cock; and a link attached to the exterior of said hollow receptacle and connecting the same with the vehicle spring, substantially as described for the purpose specified.

4. A shock absorber for motor vehicles comprising a bracket attachable to some standing part of the vehicle; a stud fixed upon said bracket; a member $b$ keyed to said stud; a hollow quadrantal receptacle oscillating on said stud and enclosing said member $b$ and normally divided thereby into two approximately equal chambers $h$ and $h'$; a valve located in said member $b$ and operating to permit the contents of the chamber $h$ to pass unchecked into the chamber $h'$, while preventing a flow of the contents in the reverse direction; a pipe connecting said chambers and provided with a regulating cock; and a link attached to the exterior of said hollow receptacle and connecting the same with the vehicle spring, substantially as described for the purpose specified.

In testimony whereof I affix my signature in presence of two witnesses.

JAMES H. TAYLOR.

Witnesses:
 ALFRED GOODHUE,
 EDITH M. BROMLEY.